United States Patent [19]

Hill, Jr. et al.

[11] Patent Number: 4,661,322

[45] Date of Patent: Apr. 28, 1987

[54] FLUE FOR THE PRODUCTION OF SOFT TIO2 AGGLOMERATES

[75] Inventors: Joel B. Hill, Jr., Eva, Tenn.; William E. Stevens; Reg Davies, both of Newark, Del.

[73] Assignee: E. I. Du Pont de Nemours and Company, Wilmington, Del.

[21] Appl. No.: 623,907

[22] Filed: Jun. 25, 1984

Related U.S. Application Data

[63] Continuation-in-part of Ser. No. 352,075, Feb. 25, 1982, Pat. No. 4,462,979.

[51] Int. Cl.⁴ .......................... C09C 1/00; F28G 13/00
[52] U.S. Cl. .................................... 422/158; 165/47; 165/95; 34/10; 34/57 R
[58] Field of Search ................ 165/1, 95, DIG. 5, 47, 165/147; 34/10, 20, 57 B, 57 R; 422/158

[56] References Cited

U.S. PATENT DOCUMENTS

| | | | |
|---|---|---|---|
| 2,689,112 | 9/1954 | Gilmore | 165/147 |
| 2,880,093 | 3/1959 | Kuhlmann et al. | 34/10 |
| 3,367,034 | 2/1968 | Good | 34/10 |
| 4,462,979 | 7/1984 | Stevens et al. | 165/1 |

FOREIGN PATENT DOCUMENTS

| | | | |
|---|---|---|---|
| 278704 | 4/1929 | United Kingdom | 165/147 |
| 2115132 | 9/1983 | United Kingdom | 165/DIG. 5 |

Primary Examiner—Albert W. Davis, Jr.

[57] ABSTRACT

A flue for cooling the flow of reaction product from the high temperature oxidation of a metal halide to the metal oxide in the presence of oxygen, said flue comprising a first section of a given cross-sectional area and a second section wherein the cross-sectional area is decreased thereby increasing the velocity and turbulence of the flow.

6 Claims, 2 Drawing Figures

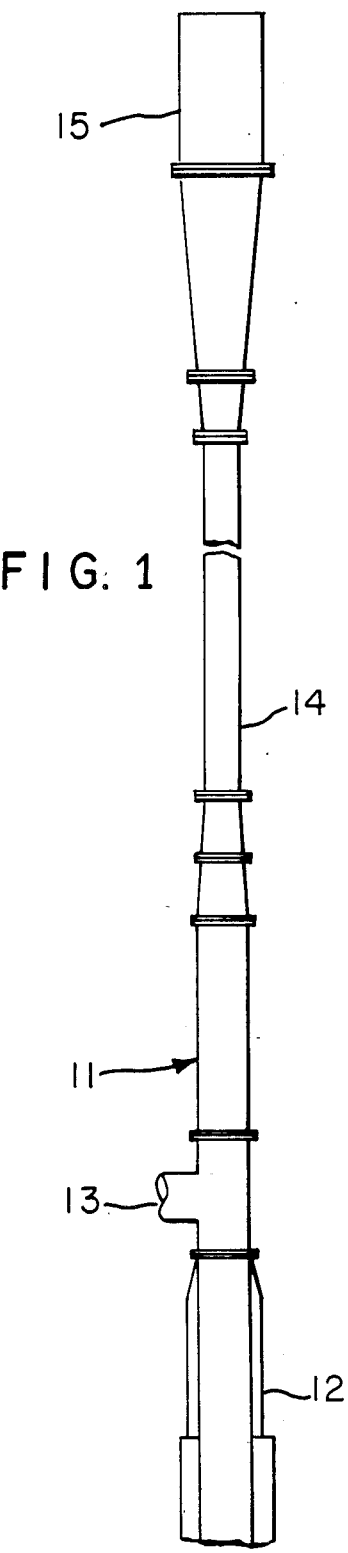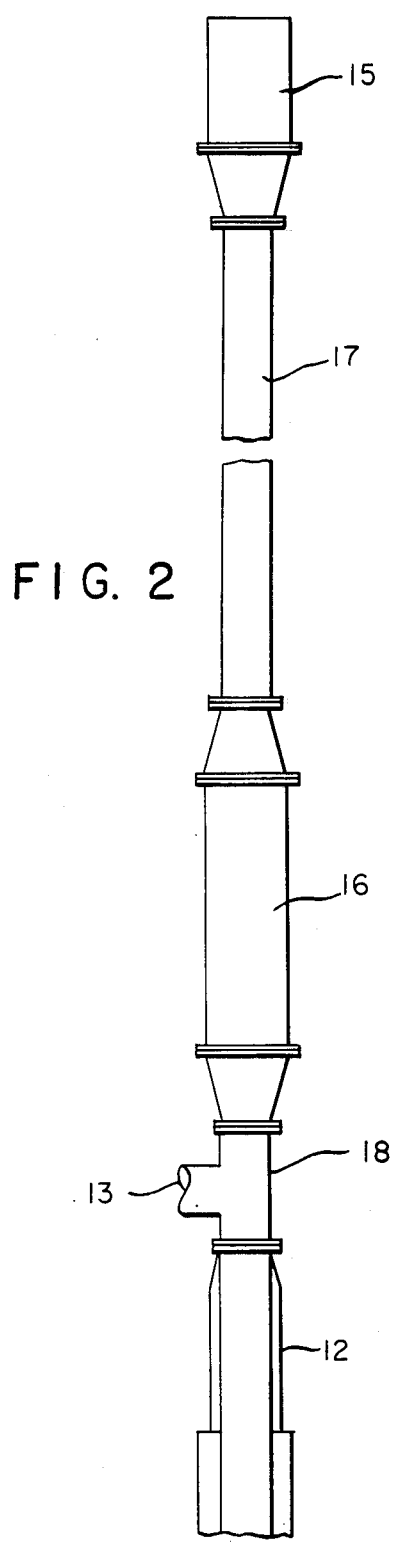

FLUE FOR THE PRODUCTION OF SOFT TIO₂ AGGLOMERATES

CROSS REFERENCE TO RELATED APPLICATION

This application is a cotinuation-in-part of application Ser. No. 325,075 filed Feb. 25, 1982, now U.S. Pat. No. 4,462,979 granted July 31, 1984.

DESCRIPTION

1. Technical Field

This invention relates to a cooling flue configuration for an oxidation system wherein a metal halide is oxidized to the metal oxide with oxygen at high temperatures. The metal oxide produced is in the form of agglomerates which are readily filtered and can be easily deagglomerated in conventional grinding.

2. Background Art

In the production of titanium dioxide pigment described in U.S. Pat. No. 2,833,627, vaporized and preheated titanium tetrachloride is fed to a high temperature reaction zone where it is mixed with oxygen or oxygen-containing gases. The oxygen and the titanium tetrachloride react to form chlorine and titanium dioxide, and the latter is carried from the principal reaction zone as a suspension in a mixture of chlorine and residual gases. This exiting suspension is usually at temperatures considerably in excess of 1000° C.; and due to this high temperature and corrosive nature of the gases present, it is necessary to cool this suspension before separating its components. Cooling can be achieved by passing the hot, gas-containing reaction products through a heat exchanger such as a long conduit or pipe having cooled walls.

It is known that the cooling of such gaseous suspensions and the precipitation and separation of the fine solid particles from the suspension gases involve great technical difficulties. In many cases the cooling must be effected very rapidly in order to avoid an undesirable growth of fine solid particles, which would decrease their usefulness as pigments or add to the expense of achieving the desired properties.

U.S. Pat. No. 2,909,409 discloses cooling the oxidation products from titanium tetrachloride and oxygen oxidation by the use of cool gases containing suspended TiO₂.

U.S. Pat. No. 3,217,787 discloses the cooling of hot gaseous suspensions of TiO₂ particles and that the particles behave as if they were plastic and sticky at 400°-1800° C. This stickiness causes the pigment to form soft, loosely adherent coatings on the surface. The need to cool rapidly below the tack point for the pigment to avoid formation of soft, loosely adherent coatings is also disclosed.

U.S. Pat. No. 3,506,065 discloses the cooling of a mixture of TiO₂ burdened reaction gases by contacting with cooled reaction gases thereby controlling the quenching rate of the TiO₂. The temperature reduction by said cooling is sufficient to decrease stickiness of the pigment to avoid TiO₂ depositions on the cooling chamber surfaces.

SUMMARY OF THE INVENTION

The present invention relates to a flue for cooling and transferring the reaction products from a reactor for the high temperature oxidation of a metal halide. The flue comprises a first section of a given cross-sectional area followed by a second section of reduced cross-sectional area which results in the products from the reactor being conveyed in a more turbulent manner. The metal oxide product from such a flue is in the form of agglomerates which are more readily deagglomerated than the agglomerates formed in a conventional flue of uniform cross-section.

In another embodiment, prior to the first section there is an additional section having a decreased cross-sectional area relative to the first section. This embodiment also provides a product which is easier to deagglomerate.

BRIEF DESCRIPTION OF THE DRAWING

FIG. 1 is a cross-section of a flue having first and second sections of different cross-sectional area.

FIG. 2 is a cross-section of a flue which has an additional section present.

DETAILED DESCRIPTION OF THE DRAWING

FIG. 1 depicts a flue of the invention wherein an insulated outlet section 12 fits to an oxidation reactor (not shown). Connected to the insulated outlet section is the first section 11 of the flue; this section has an increased cross-sectional area as compared to the second section 14 of the flue. In this embodiment the first section has the same cross-sectional area as the insulated outlet 12.

Scrub solids are fed into section 11 through scrub solids tie 13. Scrub solids are an abrasive material used to prevent buildup of material on the inside walls of the flue. The flue is reduced in cross-sectional area in second section 14 to increase the turbulence therein. Thereafter the partially cooled contents of the flue are slowed down by increasing the diameter of the flue in section 15. The contents of the flue are then separated into individual components by means not shown.

FIG. 2 illustrates a similar flue with an additional section 18 of decreased cross-sectional area prior to the first flue section 16. The additional section will have a turbulence, as defined by Reynolds number, of 75,000 to 1,600,000; preferably 200,000 to 1,300,000 and most preferably 300,000 to 1,000,000. From the first section the gaseous mixture flow into a second section 17 of reduced diameter and thereafter into section 15. In this embodiment the first section 16 has an increased cross-sectional area as compared to the insulated outlet 12.

DETAILED DISCLOSURE

It has been found that if the turbulence of the gaseous mixture from a reaction chamber for the reaction of TiCl₄ and oxygen is maintained in a certain range defined by Reynolds number, while the thus formed TiO₂ particles are in a particular temperature range while cooling, the tendency of the TiO₂ particles to form hard agglomerates is minimized as compared to agglomerates that are formed in a system wherein the turbulence is maintained at 75,000–1,600,000 Reynolds number and not increased. In essence the particles are caused to flow with increased turbulence in the second section relative to a first section whereby the particles of TiO₂ agglomerate to form soft agglomerates that are easily filterable. These soft agglomerates of TiO₂ survive slurrying and wet treatment (precipitation of materials, e.g., silica, alumina, etc., on the surface of the TiO₂ particles to enhance pigmentary characteristics) thereby resulting in much faster filtration rates than agglomerates otherwise obtained. The soft agglomerates, however, do not survive grinding. The grinding energy necessary to grind the soft agglomerates to achieve the desired pigmentary properties, e.g., in a fluid energy mill, is less than when conventional hard agglomerates are produced.

"Hard agglomerates" means agglomerates of ultimate particles of $TiO_2$ that are harder to break up, as evidenced by higher steam to pigment ratio in a fluid energy mill to reach a given paint film gloss, than agglomerates produced in a flue of the present invention. Such hard agglomerates can be attained by use of a flue that has a constant turbulence of the magnitude of 75,000–1,600,000 Reynolds number.

"Soft agglomerates" means agglomerates of ultimate particles of $TiO_2$ that are easier to break up, as evidenced by a lower steam to pigment ratio in a fluid energy mill to reach a given paint film gloss, than agglomerates produced in a flue where there is littler or no change in turbulence. Soft agglomerates can be attained by passing $TiO_2$ particles from an oxidation chamber through the flue of the present invention.

The use of a flue configuration that produces little change in the turbulence of the reaction mixture during cooling, other than turbulence changes caused by physical property changes as the reaction mixture cools, referred to herein as constant turbulence, can result in the formation of hard agglomerates. These hard agglomerates, although, possessing filtration rates slightly better than the filtration rates provided by the products of the present invention require high energy requirements to grind to pigmentary size.

It has also been found that if turbulence is maintained constant by the use of a constant cross-sectional flue at a Reynolds number of 50,000–1,000,000, without any subsequent increased turbulence, $TiO_2$ agglomerates are produced that are softer than agglomerates prepared in a flue under constant turbulence at more than a Reynolds number of 1,000,000. The $TiO_2$ particles produced from such a flue are equivalent in softness to the $TiO_2$ agglomerates made by the process of this invention. However, the soft agglomerates that are produced in such a flue do not filter as readily as the agglomerates prepared under constant turbulence at more than 1,000,000 Reynolds number or as readily as the agglomerates resulting from the present invention.

The present invention thus results in the preparation of $TiO_2$ agglomerates that can be ground with less energy than agglomerates prepared in a flue of constant turbulence of more than 1,000,000 Reynolds number and yet filter more rapidly than those made in flues designed merely to have the lower turbulence of less than 1,000,000 Reynolds number.

Accordingly, the invention involves a reaction cooling flue configuration, useful in transferring and cooling reaction products from the oxidation chamber for the oxidation of a metal halide to the metal oxide with oxygen at high temperatures, which comprises a first section of flue wherein the reaction products from the oxidation chamber are conveyed in a turbulent manner as defined by a Reynolds number generally of from 50,000–1,000,000, preferably 100,000–800,000 and most preferably 250,000–700,000 and then subsequently a second section wherein the reaction products are conveyed in a more turbulent manner as defined generally by a Reynolds number of from 75,000–1,600,000, preferably 200,000–1,300,000 and most preferably 300,000–1,000,000.

In accordance with the invention a reaction cooling system configuration, also referred to herein as a flue, has been found that is useful in transferring and cooling reaction products from the high temperature oxidation chamber for the oxidation of a metal halide to the metal oxide with oxygen, said flue having a first section with the same or greater cross-sectional area relative to a reaction chamber outlet immediately preceding the first section needed to achieve the required Reynolds number, followed by a second section with reduced cross-sectional area, said second section defined as a configuration that can provide an increase in the turbulence of the reaction product through the second section. Turbulence in the sections of the flue is evidenced by the Reynolds number of the reaction product. In the present application the Reynolds number was calculated based on the gaseous component without the inclusion of any solid component. The solid component, e.g., $TiO_2$, scrubbing solids, etc., generally amounts to about 10–45% by weight of the total flow.

The process of the invention involves the use of the flue described herein for cooling $TiO_2$ particles. Accordingly, the present invention is also a process for preparing pigmentary $TiO_2$ by vapor phase oxidation of $TiCl_4$ in a reaction chamber at temperatures above 900° C. wherein a gaseous effluent product stream is removed from the reaction chamber via a flue, where the $TiO_2$ and the gaseous mixture, including any diluents normally used for such oxidation, are cooled, the improvement comprising removing the product stream through a flue of a configuration that can produce a turbulence of the flow containing the reaction product during a period when the $TiO_2$ particles are in a sticky state during which time the particles tend to form hard agglomerates followed by a flue configuration that can produce an increased turbulence of the flow of reaction product, relative to that of the first section, when the pigmentary particles of $TiO_2$ tend to form soft agglomerates thereby producing $TiO_2$ in the form of soft agglomerates which have a faster filtration rate than agglomerates prepared in flues outside the scope of the invention and which are more easily deagglomerated to pigmentary size.

The flue is merely a section after the reaction chamber through which the reaction products pass in order to cool the products formed. Although some further reaction usually does occur, after the reaction chamber, in the flue, the reaction is practically complete in the reaction chamber.

The location of the first section that will provide the desired turbulence for the $TiO_2$/gaseous reaction products must be in the temperature region where hard agglomerates of $TiO_2$ can be formed. The exact physical location and length of the section depends on the makeup of the mixture being reacted and the temperature. This configuration (e.g., in the case of a cylindrical flue), can be a first section with the same diameter as the reaction chamber outlet as illustrated in FIG. 1 or a larger diameter relative to the reaction chamber outlet as illustrated in FIG. 2 for a sufficient length for the $TiO_2$ to reach a temperature where the formation of hard agglomerates is minimized.

The location of the second section that will provide the desired turbulence for the $TiO_2$/gaseous reaction products must be in the temperature region where soft agglomeration of $TiO_2$ can be formed. The exact physical location and length depends on the makeup of the mixture being reacted and the temperature. This configuration (e.g., in the case of a cylindrical flue), is a section with a reduced or decreased diameter relative to the first section and having a sufficient length for the $TiO_2$ to form soft agglomerates of $TiO_2$.

The first section is generally located where the average estimated temperature of the gaseous stream is in the range of 1100°–1900° K., preferably 1400°–1750° K., while the second section is in the range 1000°–1800° K., preferably 1500°–1650° K. The above temperatures are assumed to be also the temperature of the $TiO_2$ in the gaseous stream.

Thus the desired length of the first section is dependent on temperature. The desired length of the second section, however, is dependent on the temperature, turbulence and time. Generally, residence time in the second section is at least 0.05 and preferably at least 0.10 second.

The reaction chamber length for purposes of this invention begins with the point of addition of the metal halide to the oxygen. This point of addition into the reaction chamber is referred to as the inlet. When the first section referred to above is located too distant from the inlet, the temperature will be such that hard agglomerates will have formed before the reduced second section. The first section can be located as near to the inlet as possible provided sufficient length and cooling has been allowed for the formation of pigmentary size ultimate particles of $TiO_2$. Ultimate particles of $TiO_2$ are those that are not significantly reduced by grinding such as in the fluid energy mill.

The location of the second section wherein the turbulence of the gaseous reaction product mixture flow is caused to increase can be defined with respect to the properties of the $TiO_2$ produced. The second section should be located within sufficient distance of the reaction chamber to give soft agglomerates of $TiO_2$ that will filter more readily than agglomerates produced by a flue with merely an expanded section. This location is where the $TiO_2$ particles are less sticky and particles are less sticky when they have passed from the liquid phase to the solid phase but are still high enough in temperature to be sticky. Generally filtration washing rates of the present invention are 1.0–3.0 ml/sec and usually 1.0/2.0 ml/sec. The washing rate was found to be proportional to the overall filtration of the aqueous agglomerate slurry, both in the untreated and treated state.

Although the invention has been described in regard to a flue with a given cross-sectional area that is for the sections of the flue, in order to have the Reynolds number flow defined, the means for attaining the Reynolds numbers given may vary considerably.

The flue can be periodically or continuously treated with conveyed solids to scrub the walls and free them from deposits. Such methods are disclosed in U.S. Pat. No. 3,511,308.

The invention is further illustrated by the example below.

EXAMPLE 1

Vapor phase oxidation of titanium tetrachloride was carried out in a high temperature cylindrical reaction vessel. The resulting oxidation products comprising a suspension of titanium dioxide particles in a gaseous stream comprising chlorine, unreacted oxygen and other conventional diluents having a total solids content of 31% by weight, were passed through a water-cooled cylindrical flue having a first section of expanded cross-sectional area sufficient to provide an average Reynolds number of 637,000. The estimated average temperature of the gaseous stream entering the expanded section was 1660° K. The first section began 7.8 meters from the titanium tetrachloride inlet point and was 11.2 meters long followed by a second section 18 meters in length of reduced cross-sectional area sufficient to provide a Reynolds number of 960,000. The estimated average temperature of the gaseous stream entering the reduced section was 1560° K.

The $TiO_2$ particles were separated from the gases, slurried in water and treated with sodium aluminate and acid to deposit 3% $Al_2O_3$ on the particles. The treated $TiO_2$ was washed, filtered, dried, and fluid energy milled. The table below shows the data obtained:

| Example | Filtration Wash Rate* ml/sec Avg | Steam/Pigment Ratio Avg | Gloss 30-J Avg |
| --- | --- | --- | --- |
| 1 | 1.5 | 3.0 | 69 |
| A | 1.8 | 3.7 | 69 |
| B | 1.8 | 3.0 | 66 |
| C | 0.9 | 3.0 | 69 |

*of the untreated product.

Examples A and B were control runs conducted with a flue that had a uniform cross-section and a constant turbulence with an average Reynolds number of 955,000. The $TiO_2$ was treated in the same manner as in Example 1. Example C was a run involving a flue with a section having a uniform cross-sectional area larger than the flue of A and B. This flue provided a reduced velocity and turbulence equivalent to an average Reynolds number of 638,000. The $TiO_2$ was also treated as described in Example 1. The uniform flue sections were located 9.7 meters from the inlet and were extended to a point where the temperature was below 1100° K., where there is no significant effect on the $TiO_2$ particles.

All the above data represents an average of several runs and determinations. The gloss of 66, as compared to 69, is a significant difference. The present invention results in a significant reduction in energy to achieve the gloss that is achieved with flues outside the scope of the invention.

The above 30-J Gloss Test was carried out by sand milling the $TiO_2$ in an alkyd resin/melamine formaldehyde resin mixture at 18.8% $TiO_2$ volume concentration and thereafter applying the paint to an aluminum surface at a dry film thickness of about 0.03 mm. The paint was baked for 45 minutes at 150° C. after air drying at room temperature for 15 minutes. The gloss of the baked paint was measured at 20° by Hunter Lab Model D-16-D Glossmaster.

The above filtration rates were determined by slurrying 75 grams of $TiO_2$ in 225 grams of water at a temperature of 20°–25° C. and then pouring the slurry into a Buchner funnel using filter cloth of 0.00093 sq. meter and vacuum of 0.51 meter of mercury. The filtered $TiO_2$ is washed twice with 150 ml of water at 20°–25° C. and the average flow rate through the filter of two washings is the filtration rate.

The steam to pigment ratio is the grams of superheated steam fed to the fluid energy mill per gram of pigment fed.

It is to be understood that any of the components and conditions mentioned as suitable herein can be substituted for its counterpart in the foregoing examples and that although the invention has been described in considerably detail in the foregoing, such detail is solely for the purpose of illustration. Variations can be made in the invention by those skilled in the art without departing from the spirit and scope of the invention except as set forth in the claims.

What is claimed is:

1. In a reactor system a flue cooling and transferring the reaction products from the high temperature oxidation of a metal halide with oxygen which comprises a first section of flue with a cross sectional area designed to cause the flow of reaction products from the oxidation reaction to be conveyed in a turbulent manner as defined by a Reynolds number of from 50,000–1,000,000 and then subsequently a second section of flue with a reduced cross-sectional area designed to cause the flow of reaction products to be conveyed in a more tubulent manner than in the first section as defined by a Reynolds number of from 75,000–1,600,000.

2. The flue of claim 1 wherein the Reynolds number in the first section is 100,000–800,000 and the Reynolds number in the second section is 200,000–1,300,000.

3. The flue of claim 1 wherein the Reynolds number in the first section is 250,000–700,000 and the Reynolds number in the second section is 300,00–1,000,000.

4. The flue of claim 1 with an additional section before the first secton, said additional section having a decreased cross-sectional area realtive to the first section, designed so that the turbulence in the additional section is defined by a Reynolds number of 75,000–1,600,000.

5. The flue of claim 4 wherein the Reynolds number in the first section is 100,000–800,000 and the Reynolds number in the additional section and the second section is 200,000–1,300,000.

6. The flue of claim 4 wherein the Reynolds number in the first section is 250,000–700,000 and the Reynolds number in the additional section and the second section is 300,000–1,000,000.

* * * * *